United States Patent [19]

Farcnik

[11] 4,277,355
[45] Jul. 7, 1981

[54] INSULATIVE FIREPROOF TEXTURED COATING

[76] Inventor: Alexander Farcnik, 2237 Hurley Way, Apt. No. 76, Sacramento, Calif. 95825

[21] Appl. No.: 192,073

[22] Filed: Sep. 29, 1980

Related U.S. Application Data

[63] Continuation-in-part of Ser. No. 79,957, Sep. 28, 1979, abandoned.

[51] Int. Cl.$^3$ .................... C04B 43/00; C04B 43/08; C09D 7/12; C09D 1/04
[52] U.S. Cl. .................. 252/62; 106/15.05; 106/18.12; 106/18.25; 106/18.29; 106/80; 106/83; 106/84
[58] Field of Search ............ 106/18.12, 18.25, 18.29, 106/80, 83, 84, 15.05; 252/62; 428/452, 453

[56] References Cited

U.S. PATENT DOCUMENTS

| | | | |
|---|---|---|---|
| 3,655,564 | 4/1972 | Barrington | 252/62 |
| 3,752,696 | 8/1973 | Beyard et al. | 106/83 |
| 4,041,000 | 8/1977 | Farcnik | 260/29.6 B |
| 4,231,884 | 11/1980 | Dorius | 252/62 |
| 4,234,639 | 11/1980 | Graham | 106/18.12 X |

FOREIGN PATENT DOCUMENTS

| | | | |
|---|---|---|---|
| 2378076 | 9/1978 | France | 106/18.12 |
| 45-17068 | 6/1970 | Japan | 106/18.12 |
| 1499804 | 2/1978 | United Kingdom | 252/62 |

*Primary Examiner*—Helen M. McCarthy
*Attorney, Agent, or Firm*—John J. Posta, Jr

[57] ABSTRACT

The improved insulative fireproof textured coating composition includes water in a substantial proportion as a vehicle, in which particulate silica flour or the like silica-containing refractory or particulate calcium carbonate or similar non-porous filler is dispersed in substantial proportion along with thermo-insulating, porous particulate filler selected from lava rock and slag cinder. Pollution-free alkali metal silicate binder and liquid organic suspending agent selected from starch, paraffin or halogenated paraffin suspended in a vehicle are also present. Inorganic coloring agent such as titanium dioxide or other pigment may be present in a minor concentration. The composition is simple to make up, inexpensive, easy to apply and highly effective, when dried on a surface, as a hard, durable, thermally insulative, non-polluting fireproof, termite proof, textured protective layer.

7 Claims, No Drawings

INSULATIVE FIREPROOF TEXTURED COATING

COPENDING APPLICATION

This application is a Coninuation-In-Part of the inventor's U.S. Patent Application Ser. No. 079,957 filed Sept. 28, 1979, now abandoned.

BACKGROUND OF THE INVENTION

1. Field of the Invention

The present invention generally relates to protective coatings and more particularly to an improved insulative fireproof textured coating composition of improved utility.

2. Prior Art

In view of the fact that conventional home construction has a very high percentage (up to 90% or more) of flammable materials such as wood studs, rafters, joists and other framing, as well as lath work, wood flooring and sub-flooring and the like, the danger of fire is substantial. It can arise from many sources, including such hidden sources as faulty wiring, etc.

Even small commercial business buildings are fabricated largely with flammable materials and subject to the same hazards. Moreover, most conventional paints and other similar floor, wall and ceiling coating materials and coverings are highly flammable and thus add to the fire danger. For example, vinyl-based paints heat decompose to release toxic gases. In recent years efforts have been made to reduce building fire hazards by many means, including more strict electrical codes, fireproof roofing materials, etc. In some instances, flameproofing agents have been applied to internal and external walls, ceilings, etc., in the form of liquid coating compositions and the like.

Many so-called flameproof coating compositions include substantial concentrations of one or more gas-releasing components, such as thermally decomposable nitrogen-containing compounds or carbon dioxide-containing compounds, or the like to provide a protective gas blanket when decomposed by heat.

Such compositions, however, usually are severely restricted as to properties and uses, and many really are not very durable and tend to decompose and therefore are unsuitable for exterior use in contact with the elements. The gases released may also be a suffocation hazard. Moreover, such compositions also are usually relatively expensive to prepare and use and may require special application techniques. Because of these drawbacks, such compositions have not met with much success.

U.S. Pat. No. 4,041,000 discloses a greatly improved fireprotective liquid coating composition which includes a thermoplastic resin binder such as polyvinyl alcohol or polyvinyl acetate, in addition to a silica refractory, selected silicate, zinc oxide and alkali metal fluoro-silicate. That composition exhibits greatly improved fire resistance and stability over conventional compositions. However, it would be very desirable to further enhance such characteristics while increasing the thermal insulative properties of the coating, rendering the coating termite proof, and decreasing the cost of the coating. Such coating should also be totally pollution free and not release toxic gases, even when subjected to very high temperatures.

SUMMARY OF THE INVENTION

All the foregoing objects have all been achieved by the improved coating composition of the present invention. The composition is substantially as set forth in the Abstract above. It is safe, easy and inexpensive to prepare and apply, does not release any pollutants during preparation or upon drying and involves the use of innocuous, hazard-free, very low cost, readily available ingredients. Water is used as its base or vehicle, while the main constituents comprise nonporous inorganic filler and porous, thermally insulative inorganic filler, as well as water-soluble alkali metal silicate, preferably potassium silicate binding agent and selected organic suspending agent. The latter is starch or paraffin wax (chlorinated or unchlorinated) suspended in a suitable vehicle. The non-porous filler is silica-containing refractory material and/or calcium carbonate, while the porous filler is lava rock and/or slag cinders. Inorganic coloring agents such as titanium oxide may also be present.

The concentrations and particle sizes of the fillers are controlled to provide desired texture, thermal insulation and consistency to the composition. The composition has a reasonable latitude in proportions of ingredients, so that it is equally useful for interior and exterior applications to walls, framing, roofing, etc. In its dried form, it weathers well, that is, it does not break down under usual atmospheric temperature conditions, resists termites, does not deteriorate in contact with fog, rain, or snow and in full sunlight. The set coating fully fireproofs material which it covers and provides them with an effective thermal barrier. It does not decompose at elevated temperatures and release toxic substances. The coating can be provided in attractive colors and can be set to various textures, as desired for decorative purposes. Various other features are set forth in the following detailed description.

DETAILED DESCRIPTION

Now referring more particularly to the improved composition of the present invention, this composition contains a substantial concentration of water as the base or vehicle which concentration will vary, depending upon the use and manner of application of the composition.

Thus, when the present composition is to be brushed or rolled on a surface, its water concentration will usually be less than when it is to be sprayed on a surface. The composition contains 31 to about 34 volume % of water. No organic solvents need be used in the composition, nor need any harsh flammable, dangerous, potentially polluting chemicals be employed.

In preparing the liquid coating composition, the water is usually first mixed with the water soluble alkali metal silicate binder of the composition. Preferably, potassium silicate is utilized, although sodium silicate is also desirable. The silicate is usually utilized in the composition in a concentration of about 12 to about 18 volume % of the composition in order to achieve the desired results. Moreover, the concentration of the water-silicate mixture in the coating composition is controlled and must be about 41–49 volume % of the composition in order to achieve the desired consistency, spreadability, suspension of solids, etc.

Potassium silicate has the chemical formula $K_2SiO_3$ and is soluble in water. In glass form it has a weight ratio of $SiO_2:K_2O$ of about 2.1:1–2.5:1 and is colorless and water soluble at elevated temperatures. As a water solution, potassium silicate contains various ratios of $SiO_2:K_2O$, principally from 1.8:1 to 3.3:1 and is commercially utilized in a wide variety of application, including detergents, adhesives, and catalysts.

Sodium silicate can also be used either in the liquid or solid form. As a liquid it has the formula $Na_2Si_2O_9 \cdot H_2O$, is known as water glass and is soluble in water. As a solid it has the formula $Na_2SiO_3$, is soluble in water and is used commercially as an adhesive, binder and the like.

The main solids used in the present composition are fillers of two main types, namely, (a) particulate, essentially nonporous inorganic fillers selected from the group consisting of silica-containing refractory materials, calcium carbonate and mixtures thereof, and (b) particulate, essentially porous, thermally insulative inorganic fillers selected from the group consisting of lava rock, slag cinders and mixtures thereof.

A typical example of silica-containing refractories is known as silica flour ($SiO_2$) containing more silica and alumina than basic oxides and capable of withstanding temperatures in excess of about 1,600° C. without fusing.

Calcium carbonate has the formula $CaCO_3$, is a water insoluble, white crystalline material and is available as a purified chemical and also as a natural mineral, occuring in nature as aragonite, calcite, chalk, limestone, lithographic stone, marble, marl and travertine.

The essentially non-porous filler is utilized in the present composition in fine particulate size averaging about 140–400 U.S. Standard mesh and in a concentration which, taken together with that of the porous filler, usually is at least about 45 volume percent and normally is not in excess of about 60 volume percent of the composition. Of the two types of fillers, the non-porous type normally constitutes at least about 50 volume percent of the total filler volume in order to achieve the most desired results. Nevertheless, the porous filler is normally utilized in a substantial concentration in the formulations of the present composition in order to impart desired thermal insulation to the coating for improved fire proofing.

The porous particulate filler can be either lava rock or slag cinders or both. Lava rock is that rock which is ejected in molten form from volcanoes. It usually comprises a mixture of silicates, the silica content being about 40–80 percent, the balance usually consisting of oxides of aluminum, iron, calcium, magnesium, potassium and sodium, together with some water. It is used in scrubbing and cleaning agents and the like.

Slag cinders constitute the product which separates in metal smelting and floats on the latch of metal. Typically, slag cinders contain compounds derived from silica, lime, alumina, magnesia, magnanese, phosphorus and sulfur, as well as ore elements. It is commercially used as ballast, and in concrete aggregates, in the manufacture of mineral wool and as a fertilizer.

The porous, inorganic, thermally insulative filler is utilized in the composition of the present invention in an average particle size range of about 16–100 U.S. Standard mesh, the concentration and sizes employed depending on the properties and uses desired for the coating composition. The fillers can be premixed, if desired, to the correct proportions for subsequent blending with the water-silicate mixture.

The coating composition also includes a liquid organic suspending agent comprising usually a major proportion of a suitable vehicle, such as water or the like, in which is suspended usually a minor proportion, for example 10–40 percent by volume, of material selected from the group consisting of starch, paraffin, halogenated paraffin and mixtures thereof.

The starch can be, for example, potato starch, corn starch or the like disposed as a dispersion for example, or colloidal suspension in water. Heating or boiling of the starch in water, to about 80° C., may be required to initially dissolve the starch to form the desired solution.

The paraffin can be modified, as by chlorination or the like. Chlorowax, a U.S. Registered Trademark of Diamond Alkali Company for paraffin containing about 40–70% by weight of chlorine is an example. Alternatively, the paraffin can be unmodified. The paraffin can be disposed as a suspension or solution in a suitable vehicle such as aliphatic ethanol or the like, or as a very fine colloidal dispersion in water, as by passing through a colloid mill or the like. If an organic solvent such as alcohol is being used as the vehicle for the paraffin, this vehicle is in any event, volatilized off from the coating during setting of the coating. Moreover, the very small concentration of the suspending agent, usually about 0.8–1.2% by volume, normally used in the composition of the present invention has no effect on the ultimate flame retarding properties of liquid coating composition, nor does it pose a hazard during setting of the coating. However, it may give more flexibility to the coating composition so that when the coating has been applied to a surface such as wood which expands and contracts in the elements, the coating does not separate from the substrate.

The suspending agent can be added in the desired proportion to water-silicate mixture before or after blending of the fillers with the water-silicate mixture.

It is also desired in certain instances to color the improved composition. This can be done by adding to the composition a small concentration of inorganic agent, preferably a nonflammable inorganic oxide such as cuprous oxide. $Cu_2O$, for a red color cupric oxide, $CuO$, for a black color, ferric oxide, $Fe_2O_3$, for a red color, cobalt blue, $Co(AlO_2)_2$, for a blue to green color, cobaltic oxide, $Co_2O_3$, or cobalto-cobaltic oxide, $C_0O_4$, for a steel-grey to black color, chromic oxide, $Cr_2O_3$, for a green color, or chrome yellow, $PbCrO_4$, for a yellow color. It will be understood that the described coloring is optional, although desirable. The coloring agent can be added at any point in the preparation of the coating composition. A white coating composition can be provided through the use of titanium dioxide.

In preparing the present composition, it is desirable to assure that thorough blending together of all the constituents occurs. In the preferred mode all liquids are blended together, and all solids are blended together, after which the resulting mixtures are combined and blended. Upon completion of the blending steps, the composition is ready for use.

The following specific Examples further illustrate certain features of the present invention.

EXAMPLE I

The liquid coating composition set forth in Table I below is prepared from the ingredients specified in Table I below:

TABLE I

| Ingredients | Amount | Concentration Volume - % |
|---|---|---|
| Liquids: | | |

TABLE I-continued

| Ingredients | Amount | Concentration Volume - % |
|---|---|---|
| water | 2182 ml | 31% |
| potassium silicate (liquid) | 915 ml | 13% |
| starch corn (solution in water) | 70 ml | 1% |
| Liquids total | 3167 ml | 45% |
| Solids: | | |
| non-porous filler (silica flour 140-325 mesh) | 1760 ml | 25% |
| porous lava rock (16-40 mesh) | 1056 ml | 15% |
| titanium dioxide (400 mesh) | 352 ml | 5% |
| lava rock (40-100 mesh) | 704 ml | 10% |
| Solids total | 3872 ml | 55% |
| Total liquid and solids | 7039 ml | 100% |

ALL MESH SIZES ARE U.S. STANDARD MESH.

In preparing the composition, the liquid constituents are first mixed together, after which the solids are dry blended together and the resulting solids mixture is then thoroughly blended into the liquid mixture to form the finished coating composition. Two coats of this composition are rolled on 8"×20"×1" cedar shingles, allowed to dry for 12 hours and then tested as follows:

The coated cedar shingles are tested in accordance with the specifications of ASTM E-84, both as to equipment and test procedure. The procedure is comparable to UL723, NEPA No. 255 and ABC No. 42-1, as well. Ignition is noted 59 seconds after the test begins, with charring and slight cracking of the coating. The fuel contribution and smoke density are nil. The flame front advances to 3.5 ft. and then recedes. The test time is 10 minutes. The coated shingles receive a flame spread rating of 15 from this test, indicating that they are in the safest, best and highest NEPA class, Class A and in the highest UBC class, Class I.

NFPA is the abbreviation for National Fire Protection Association, UBC is the abbreviation for the Uniform Building Code, 1976 edition. Part VIII, Chapter 42, Sections 4201-4203 of UBC covers the fire resistance standard for fire protection applicable to the test.

Accordingly, cedar shingles coated with the novel composition of the present invention (Table I) demonstrate the highest fire safety code rating obtainable and thus improved utility.

EXAMPLE II

The liquid coating composition set forth in Table II below is prepared:

TABLE II

| Ingredients | Amount | Concentration Volume - % |
|---|---|---|
| Liquids: | | |
| water | 1206 ml | 34% |
| sodium silicate | 422 ml | 12% |
| paraffin in ethanol | 35 ml | 1% |
| Liquids total | 1653 ml | 47% |
| Solids: | | |
| non-porous calcium carbonate (140-325 mesh) | 880 m. | 25% |
| porous slag cinders (16-40 mesh) | 528 ml | 15% |
| (40-100 mesh) | 352 ml | 10% |
| red ferric oxide (400 mesh) | 106 ml | 3% |
| Solids total | 1866 ml | 53% |

TABLE II-continued

| Ingredients | Amount | Concentration Volume - % |
|---|---|---|
| Total liquids and solids | 3519 ml | 100% |

ALL MESH SIZES WERE U.S. STANDARD MESH.

The coating composition is prepared in accordance with the procedure set forth in Example I, after which it is painted on an exterior wooden siding to a thickness of about 1/16", allowed to dry 6 hours, and then tested by holding an acetylene torch so that its flame is 6 inches from the coated side of the siding while the siding is at a 45° angle to the torch. The temperature at the coated siding surface reaches about 1200° F. and is maintained for approximately 4 minutes without burning of the siding. This is a severe test and clearly indicates the improved insulative flame retarding protection afforded by the coating of Table II.

In a first parallel test similar wooden siding is coated with the coating composition of this Example to a 1/16" thickness, allowed to dry 4 hours and then is exposed to the weather elements for 6 months. No significant weathering effects are noted.

In a second parallel test, the coating composition of this Example is coated on an interior wallboard wall of a house to a thickness of about ⅛" and, after 6 hours, is tested for flameproofness by application of a wood-fired flame directed to an area thereof for 4 minutes. No combustion or charring of the coating and/or wallboard is noted. Similar tests and results to those set forth above in this Example have been obtained for a coating composition prepared in the same manner as set forth in Example I but which has the ingredients set forth in Table III below:

TABLE III

| Ingredients | Amount | Concentration Volume - % |
|---|---|---|
| Liquids: | | |
| water | 1081 ml | 31% |
| potassium silicate | 634 ml | 18% |
| corn starch (in water) | 35 ml | 1% |
| Liquids total | 1750 ml | 50% |
| Solids: | | |
| non-porous calcium carbonate (140-325 mesh) | 879 ml | 25% |
| lava rock (16-40 mesh) | 350 ml | 10% |
| (40-100 mesh) | 141 ml | 4% |
| (100 mesh) | 352 ml | 10% |
| cupric oxide | 35 ml | 1% |
| Total solids | 1757 ml | 50% |
| Total liquids and solids | 3507 ml | 100% |

Accordingly, the improved coating composition has improved flame and heat insulative properties over the art and is very durable and useful for a wide variety of application. The tests performed on the composition clearly demonstrate the extent to which the flame resistance of wood can be enhanced by the application of the coating composition thereto. Moreover, the composition is inexpensive, and simple to make and to apply. Various other advantages are as set forth in the foregoing.

Various modifications, changes, alterations and additions in the present composition, its components, properties and parameters can be made. All such modifications, changes, alterations and additions as are within the scope of the appended claims form part of the present invention.

What is claimed is:

1. An improved insulative fireproof liquid coating composition, said composition consisting essentially of:
   a. 31 to about 34 volume percent of water as a vehicle;
   b. granular, non-porous inorganic filler selected from the group consisting of silica-containing refractory material, calcium carbonate and mixtures thereof;
   c. pollution-free water-soluble alkali metal silicate binder, the combined concentration of said water and said silicate being 41 to about 49 volume percent;
   d. granular, porous thermoinsulating inorganic filler selected from the group consisting of lava rock, cinder slag and mixtures thereof; and
   e. about 0.8–1.2 volume percent of liquid organic suspending agent comprising a vehicle having therein material selected from the group consisting of starch, paraffin, halogenated paraffin and mixtures thereof.

2. The improved coating composition of claim 1 wherein said silicate comprises potassium silicate.

3. The improved coating composition of claim 1 wherein inorganic coloring agent is present in a volume concentration of up to about 4% in said composition.

4. The improved coating composition of claim 3 wherein said coloring agent comprises titanium dioxide.

5. The improved coating composition of claim 1 wherein said non-porous filler is in an average particle size range of about 140–400 U.S. Standard mesh and said porous filler is in an average particle size range of about 16–100 U.S. Standard mesh.

6. The improved coating composition of claim 5 wherein said non-porous filler is present in said composition in a volume concentration at least about equal to that of said porous filler.

7. The improved composition of claim 6 wherein said silicate is potassium silicate, wherein said non-porous filler is silica-containing refractory material, wherein said porous filler is lava rock and wherein said suspending agent is starch suspended in water.

* * * * *